US011952106B2

(12) United States Patent
Umetsu et al.

(10) Patent No.: US 11,952,106 B2
(45) Date of Patent: Apr. 9, 2024

(54) ROTARY ACTUATED SPOILER CONFIGURATION

(71) Applicant: The Boeing Company, Chicago, IL (US)

(72) Inventors: Joli K. Umetsu, Seattle, WA (US); Kevin Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 71 days.

(21) Appl. No.: 17/657,859

(22) Filed: Apr. 4, 2022

(65) Prior Publication Data
US 2022/0340264 A1 Oct. 27, 2022

Related U.S. Application Data

(60) Provisional application No. 63/213,441, filed on Jun. 22, 2021, provisional application No. 63/201,283, filed on Apr. 21, 2021.

(51) Int. Cl.
*B64C 13/50* (2006.01)
*B64C 9/02* (2006.01)
*B64C 9/20* (2006.01)

(52) U.S. Cl.
CPC ............. *B64C 13/50* (2013.01); *B64C 9/02* (2013.01); *B64C 9/20* (2013.01)

(58) Field of Classification Search
CPC ....... B64C 13/28; B64C 13/30; B64C 13/341; B64C 9/02; B64C 9/04; B64C 9/08
See application file for complete search history.

(56) References Cited

U.S. PATENT DOCUMENTS

| | | | | |
|---|---|---|---|---|
| 2,620,147 A * | 12/1952 | Cook, Jr. | .................. | B64C 9/16 244/216 |
| 4,180,222 A * | 12/1979 | Thornburg | ................ | B64C 9/06 74/25 |
| 4,786,013 A * | 11/1988 | Pohl | ........................ | F16D 59/00 244/99.2 |
| 8,814,085 B2 * | 8/2014 | Richter | .............. | B64D 45/0005 244/225 |
| 2009/0302516 A1 * | 12/2009 | Steele | ................... | B64C 13/504 701/3 |
| 2013/0320152 A1 * | 12/2013 | Parker | ....................... | B64C 9/34 244/90 A |
| 2018/0162517 A1 * | 6/2018 | Brown | ....................... | B64C 9/14 |
| 2018/0304995 A1 * | 10/2018 | Harrington | ............. | B64C 13/30 |
| 2019/0226529 A1 * | 7/2019 | Meyer | ..................... | F16D 1/108 |

* cited by examiner

*Primary Examiner* — Michael H Wang
*Assistant Examiner* — Colin Zohoori
(74) *Attorney, Agent, or Firm* — Alleman Hall & Tuttle LLP

(57) ABSTRACT

An aerial vehicle control surface actuation system comprises a rotary actuator having opposing output shaft ends that are coupled to first and second torque tubes via actuator universal joints. The first and second torque tubes extend angularly from the rotary actuator. The system further comprises first and second pivot joints that are coupled to a hinged end of a control surface. The first and second pivot joints are coupled to the first and second torque tubes, respectively, via control surface universal joints. In this configuration, rotation of the first and second torque tubes causes rotation of the control surface relative to a hinge axis.

21 Claims, 9 Drawing Sheets

ROTARY ACTUATED SPOILER CONFIGURATION

CROSS-REFERENCE TO RELATED APPLICATIONS

This application claims the benefit of U.S. Provisional Patent Application Ser. No. 63/201,283, filed on Apr. 21, 2021, and U.S. Provisional Patent Application Ser. No. 63/213,441, filed on Jun. 22, 2021, the disclosures of which are hereby incorporated by reference in their entirety.

FIELD

The field of the disclosure relates generally to aircraft spoilers and, more particularly, to aircraft spoiler actuation systems and related methods.

BACKGROUND

An aircraft such as a fixed-wing plane includes control surfaces coupled to a wing of the aircraft that are selectively actuated to affect behavior of the aircraft during flight, takeoff, and/or landing. For instance, a spoiler pivotably coupled to a wing of an aircraft may be raised relative to the wing surface to reduce lift and increase drag. Alternatively, an aileron coupled to the wing may be deflected upward or downward to control roll of the aircraft.

Such control surfaces are often actuated using linear hydraulic actuators, which require several hinges at multiple points of attachment to provide sufficient force at a variety of aerodynamic loading conditions. This configuration is ill-suited for modern, thinner aircraft wings, since the actuator may protrude from the lower surface of the wing and disrupt its aerodynamic design.

Although rotary actuators have been used for control surface actuation, these designs come with their own unique challenges. Rotary actuators are typically installed directly on the control surface such that the actuator axis is concentric with the hinge line of the wing. This may drive the actuator's power requirement, and therefore its diameter, high enough that portions of the control surface's upper surface must be cut out to provide clearance for the actuation system. These "cutouts" trip the flow over the wing and degrade its performance. Additionally, mounting the rotary actuator directly to the control surface will cause any aerodynamic loading on the control surface to be reacted directly through the actuator, creating the potential for damage or reduced service life.

Thus, there is a need for a control surface rotary actuation system whose integration does not degrade the aerodynamic performance of the wing or create the potential for damage to the actuator.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an aerial vehicle control surface actuation system. The system comprises a rotary actuator having opposing output shaft ends that are coupled to first and second torque tubes via actuator universal joints. The first and second torque tubes extend angularly from the rotary actuator. The system further comprises first and second pivot joints that are coupled to a hinged end of a control surface. The first and second pivot joints are coupled to the first and second torque tubes, respectively, via control surface universal joints. In this configuration, rotation of the first and second torque tubes causes rotation of the control surface relative to a hinge axis.

Another aspect of the present disclosure is directed to an aerial vehicle comprising a fuselage, a wing including a rear spar, and a control surface actuation system mounted on the wing. The control surface actuation system comprises an actuator support fitting mounted on the rear spar, a rotary actuator mounted on the actuator support fitting, and first and second support fittings mounted on the rear spar on opposing sides of the rotary actuator. The rotary actuator has opposing output shaft ends and defines an actuator axis. The control surface actuation system further comprises first and second torque tubes that extend angularly from the opposing output shaft ends and are coupled to the opposing output shaft ends via actuator universal joints. The control surface actuation system further comprises a control surface and first and second pivot joints coupled to a hinged end of the control surface. The first and second pivot joints are connected to the first and second support fittings, respectively. The first and second pivot joints are also coupled to one of the first and second torque tubes via control surface universal joints. In this configuration, rotation of the first and second torque tubes causes rotation of the control surface relative to a hinge axis.

Another aspect of the present disclosure is directed to a method of providing a rotary-actuated control surface. The method includes securing a rotary actuator having opposing shaft ends to an aft portion of a wing structure, coupling, via actuator universal joints, the opposing output shaft ends to first and second torque tubes extending angularly from the rotary actuator, coupling first and second pivot joints to the first and second torque tubes, respectively, via control surface universal joints, coupling the first and second pivot joints to a hinged end of a control surface, securing first and second pivot mountings on the aft portion of the wing structure, each having one or more holes that define a hinge axis and are configured to support the first and second pivot joints about which the control surface rotates, and coupling the first and second pivot joints to the one or more holes in the first and second pivot mountings.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
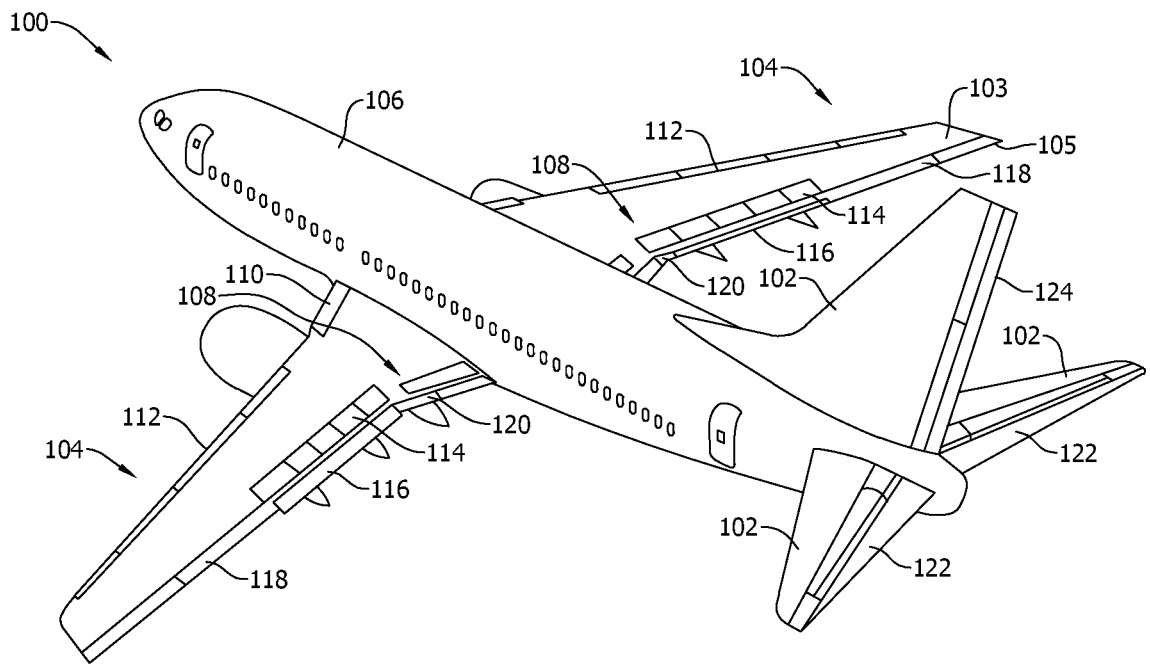
FIG. 1 is an example aircraft in which examples disclosed herein may be implemented.

FIG. 1 illustrates an example aircraft 100 in which the examples disclosed may be implemented. In the illustrated example, the aircraft 100 includes stabilizers 102 and wings 104 coupled to a fuselage 106. The wings 104 or wing structures define upper and lower surfaces (e.g., upper and lower sides, upper and lower aerodynamic surfaces, etc.) 103, 105, respectively. The wings 104 of the aircraft 100 have control surfaces 108 located along the leading and/or trailing edges of the wings 104. The control surfaces 108 may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 110, leading edge slats 112, upper surface spoilers 114 (e.g., flight spoilers, ground spoilers, upper surface spoilers, etc.), and trailing edge flaps 116 (e.g., rotatable flaps). The control surfaces 108 of the illustrated example also include ailerons 118 and flaperons 120. In this example, the stabilizers 102 include elevators 122 and a rudder 124.

To control flight of the aircraft 100, the upper surface spoilers 114 of the illustrated example alter the lift, drag, pitch, and roll of the aircraft 100. The trailing edge flaps 116 alter the lift and pitch of the aircraft 100. The ailerons 118 and the flaperons 120 of the illustrated example alter the roll of the aircraft 100. In this example, the slats 112 alter the lift of the aircraft 100. The control surfaces 108 of the illustrated example also play a role in controlling the speed of the aircraft 100. For example, the upper surface spoilers 114 may be used for braking of the aircraft 100. Any of the control surfaces 108 of the illustrated example may be independently moved (e.g., deflected) to control the load distribution in different directions over the wings 104, thereby directing movement of the aircraft 100.

The examples described herein may be applied to control surfaces associated with any of the stabilizers 102, the wings 104, the spoilers, and/or any other exterior or outboard structure (e.g., a horizontal stabilizer, a wing strut, an engine strut, a canard stabilizer, etc.) of the aircraft 100. In particular, the wings 104 and/or the stabilizers 102 may have control surfaces 108 that can be adjusted to maneuver the aircraft 100 and/or control a speed of the aircraft 100, for example. Additionally or alternatively, in some examples, the fuselage 106 has control surfaces which may be deflected to alter the flight maneuvering characteristics of the aircraft 100 during cruise and/or takeoff. Thus, the discussion of examples disclosed herein in connection with spoilers is for illustrative purposes only and does not limit the examples to use only with spoilers.

Figure 2:
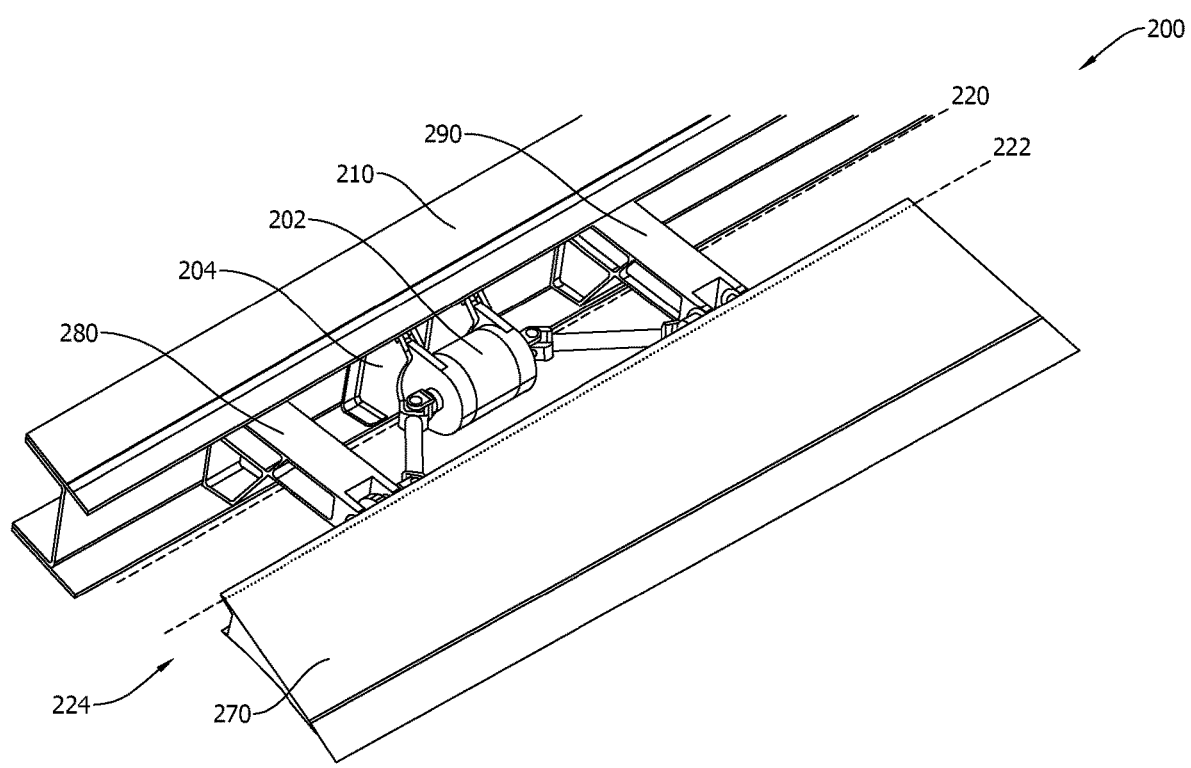
FIG. 2 is a perspective view of an aerial vehicle control surface actuation system.

An example aerial vehicle control surface actuation system 200 is shown in FIG. 2. The system comprises a rotary actuator 202 disposed on an aft portion of wings 104 (not shown) of the aircraft 100. In certain embodiments, the rotary actuator 202 is mounted to an actuator support fitting 204 that is mounted to a rear spar 210 of the wing 104. The rotary actuator 202 may be a hydraulic actuator, a pneumatic actuator, an electrical actuator, a mechanical actuator, or any other suitable type of rotary actuator that allows the system to function as described herein.

Figure 3:
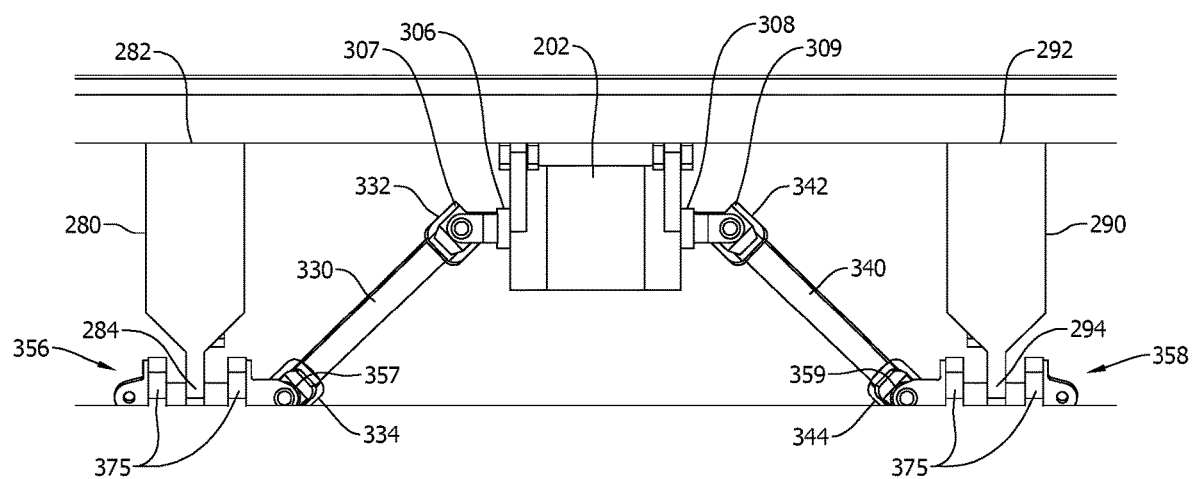
FIG. 3 is a top view of an aerial vehicle control surface actuation system.

The rotary actuator 202 defines an actuator axis 220 and, with reference to FIG. 3, has first and second opposing output shaft ends 306, 308 disposed on either side of the rotary actuator 202. The first opposing output shaft end 306 is coupled to a first end 332 of a first torque tube 330 that extends angularly from the first opposing output shaft end 306. In certain embodiments, the first opposing output shaft end 306 is coupled to the first end 332 of the first torque tube 330 by a first actuator universal joint 307. Similarly, the second opposing output shaft end 308 is coupled to a first end 342 of a second torque tube 340 that extends angularly from the second opposing output shaft end 308. In certain embodiments, the second opposing output shaft end 308 is coupled to the first end 342 of the second torque tube 340 by a second actuator universal joint 309. The first and second torque tubes 330, 340 are coupled to the first and second opposing output shaft ends 306, 308 such that rotation of the rotary actuator 202 causes rotation of the first and second torque tubes 330, 340.

The system 200 further comprises first and second pivot joints 356, 358 coupled to a hinged end 224 of a control surface 270 (FIG. 2). The hinged end 224 of the control surface 270 includes one or more lugs 375 connected thereto, each having at least one hole (not shown) aligned with a hinge axis 222 of the control surface 270. The hinge axis 222 of the control surface 270 is offset from the actuator axis 220 of the rotary actuator 202, which provides several benefits to the overall wing integration and performance, which will be described in detail below. The first pivot joint 356 is coupled to the second end 334 of the first torque tube 330, which extends angularly between the first pivot joint 356 and the first opposing output shaft end 306. In certain embodiments, the first pivot joint 356 is coupled to the second end 334 of the first torque tube 330 by a first control surface universal joint 357.

Similarly, the second pivot joint 358 is coupled to the second end 344 of the second torque tube 340, which extends angularly between the second pivot joint 358 and the second opposing output shaft end 308. In certain embodiments, the second pivot joint 358 is coupled to the second end 344 of the second torque tube 340 by a second control surface universal joint 359. The first and second pivot joints 356, 358 are coupled to the first and second torque tubes 330, 340 such that rotation of the first and second torque tubes 330, 340 causes rotation of the control surface 270 relative to the hinge axis 222. In certain embodiments, the control surface 270 and one or more lugs 375 connected thereto may be configured such that no portion of the pivot joints 356, 358 or lugs 375 extends upwards of the wing's 104 upper surface during rotation of the control surface 270. In such embodiments, the upper surface of the wing 104 may be free of cutouts for the control surface actuation system 200.

Figure 4:
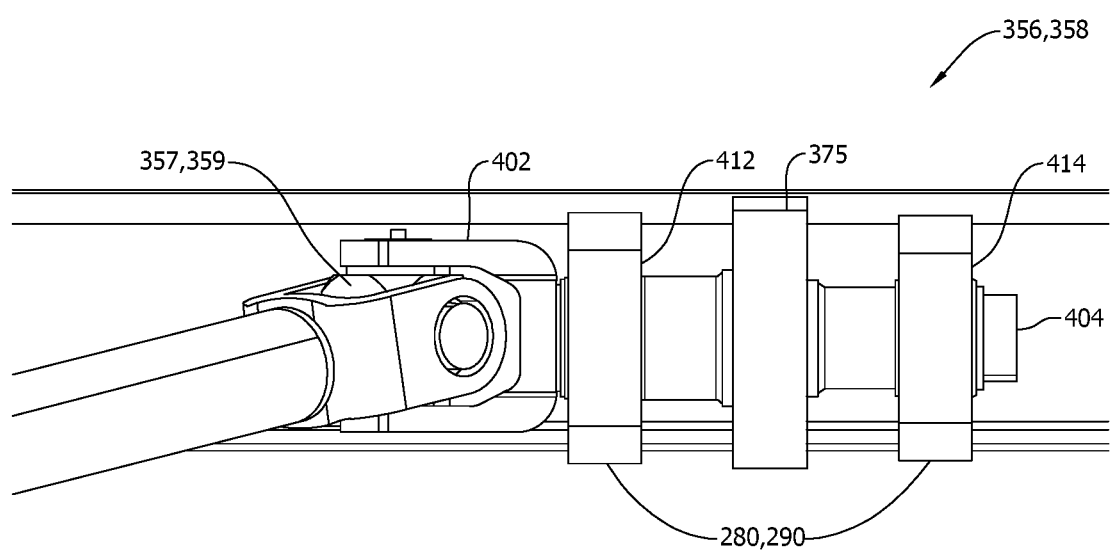
FIG. 4 is a front view of a first example embodiment of a pivot joint of the aerial vehicle control surface actuation system.

A first example embodiment of a pivot joint 356, 358 is shown in FIG. 4. The pivot joint shown in FIG. 3 may be either of the first or second pivot joint 356, 358. Each of the first and second pivot joints 356, 358 comprises a yoke 402 coupled to a drive shaft 404 that extends through one or more lugs 375 or a clevis bracket (not shown) coupled to the hinged end 224 of the control surface 270. In further embodiments, the yoke 402 may be disposed on the drive shaft 404. In certain embodiments, the drive shaft 404 may be a splined drive shaft with a plurality of ridges around its circumference, and an inner circumferential surface (not shown) of the one or more lugs 375 or clevis bracket may be a splined interface with a plurality of grooves. In such embodiments, the pivot joint 356, 358 may be configured such that the teeth of the drive shaft 404 mate with the grooves of the one or more lugs 375 or clevis bracket, preventing any relative rotation between the drive shaft 404 and the one or more lugs 375 or clevis bracket. Rotation of the drive shaft 404 will therefore cause rotation of the one or more lugs 375 or clevis bracket, which causes rotation of the control surface 270 relative to the hinge axis 222.

Figure 5:
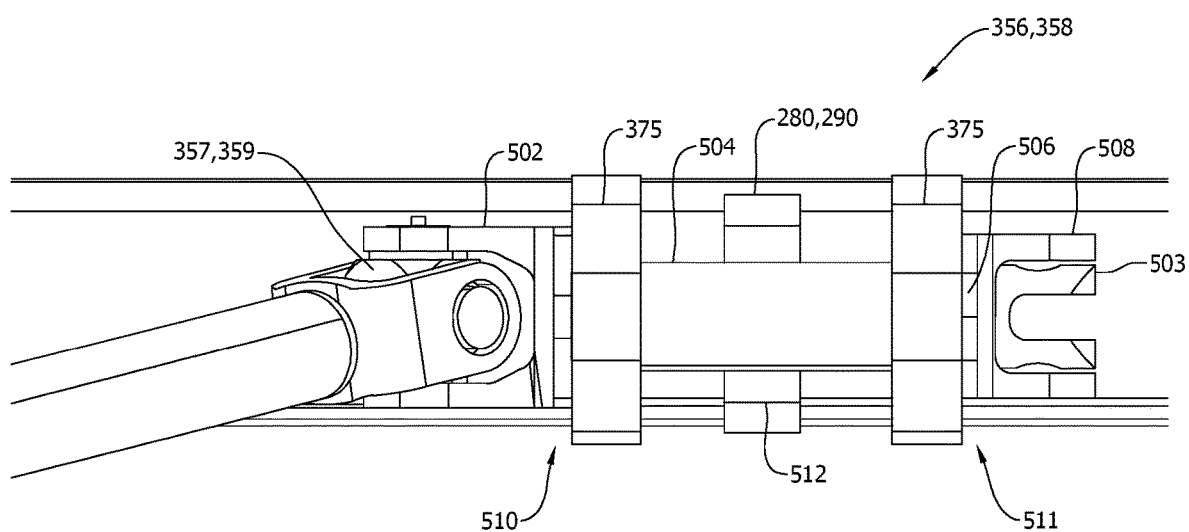
FIG. 5 is a front view of a second example embodiment of a pivot joint of the aerial vehicle control surface actuation system.

A second example embodiment of a pivot joint is shown in FIG. 5. The pivot joint shown in FIG. 5 may be either of the first or second pivot joint 356, 358. Each of the first and second pivot joints 356, 358 comprises a first yoke 502 and a second yoke 503 respectively coupled to first and second ends 510, 511 of a drive shaft 504 that extends through the at least one hole in one or more lugs 375 that are connected to the hinged end 224 of the control surface 270. In further embodiments, the first and second yokes 502, 503 may be disposed on the drive shaft 504. A flanged portion 506 of a bracket 508 disposed on the second end 511 of the drive shaft 504 is fastened to one of the one or more lugs 375, preventing any relative rotation between the drive shaft 504 and the one or more lugs 375. The bracket 508 may suitably be a discrete flanged clevis fitting with a cross bolt (not shown) extending through both the clevis fitting and the second yoke 503. Rotation of the drive shaft 504 will therefore cause rotation of the one or more lugs 375, which causes rotation of the control surface 270 relative to the hinge axis 222. The first and second pivot joints 356, 358 may both be the example embodiment shown in FIG. 4, they may both be the example embodiment shown in FIG. 5, or they may each be configured in a different embodiment.

In certain embodiments, the system includes first and second pivot mountings 280, 290, or more specifically, first and second spoiler support fittings (FIG. 2) mounted on the rear spar 210 of the wing 104. A first end 282 (FIG. 3) of the first pivot mounting 280 is mounted on the side of the wing 104 proximate the first opposing output shaft end 306, and a second end 284 of the first pivot mounting 280 supports the control surface 270 and the first pivot joint 356. A first end 292 of the second pivot mounting 290 is mounted on the side of the wing 104 proximate the second opposing output shaft end 308, and a second end 294 of the second pivot mounting 290 supports the control surface 270 and the second pivot joint 358. The first and second pivot mountings 280, 290 each have one or more holes that define the hinge axis 222 and support each of the first and second pivot joints 356, 358, about which the control surface 270 rotates. With reference to FIG. 4, the first and second pivot mountings 280, 290 of the first example embodiment each have two holes (shown as semicircular cross sections), with the four holes defining the hinge axis 222. The pivot mounting 280, 290 may be coupled to the pivot joint 356, 358 via bearings 412, 414 disposed on the drive shaft 404. With reference to FIG. 5, the first and second pivot mountings 280, 290 of the second example embodiment each have one hole (shown as a semicircular cross section), with the two holes defining the hinge axis 222. The pivot mounting 280, 290 may be coupled to the pivot joint 356, 358 via a bearing 512 disposed on the drive shaft 504.

Figure 6:
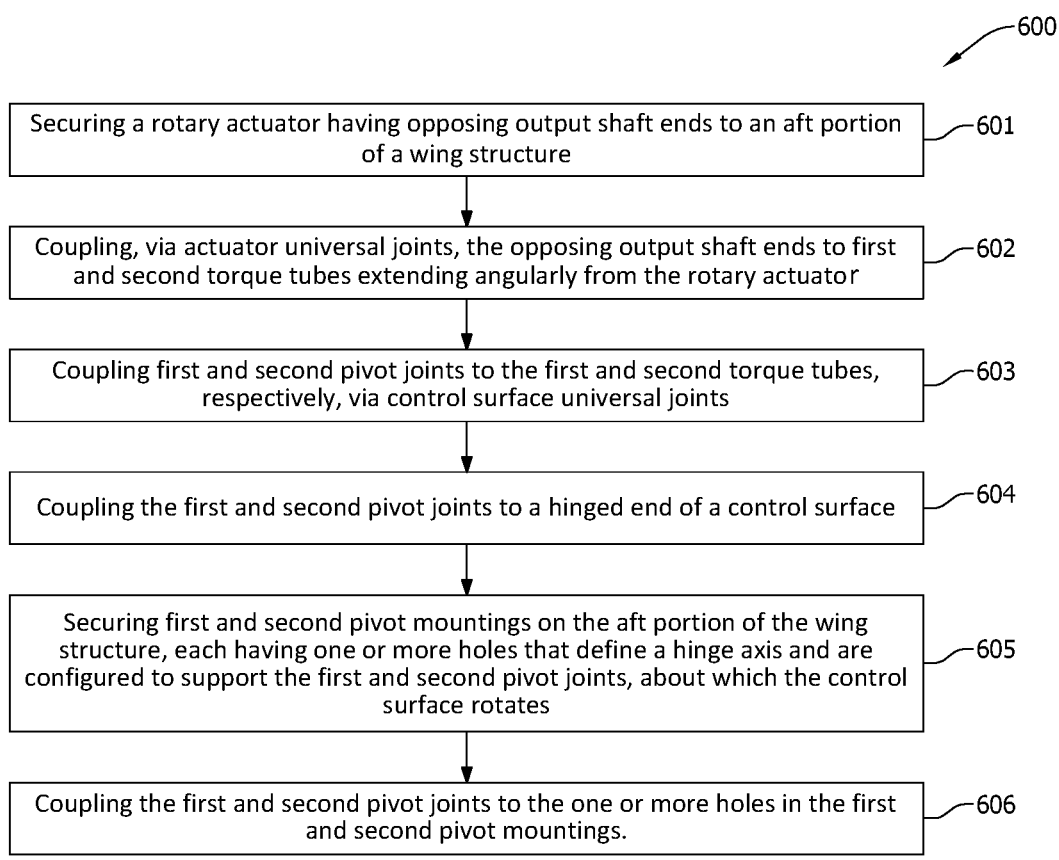
FIG. 6 is a flow diagram of a method of providing a rotary-actuated control surface.

With reference to FIG. 6, the aerial vehicle control surface actuation system 200 disclosed herein may be used with a method 600 of providing a rotary-actuated control surface. The method includes securing 601 a rotary actuator 202 having opposing output shaft ends 306, 308 to an aft portion of a wing 104, and coupling 602, via actuator universal joints 307, 309, the opposing output shaft ends 306, 308 to first and second torque tubes 330, 340 extending angularly from the rotary actuator 202. The method further includes coupling 603 first and second pivot joints 356, 358 to the first and second torque tubes 330, 340, respectively, via control surface universal joints 357, 359, and coupling 604 the first and second pivot joints 356, 358 to a hinged end 224 of a control surface 270. The method further includes securing 605 first and second pivot mountings 280, 290 on the aft portion of the wing 104, each having one or more holes that define the hinge axis 222 and are configured to support the first and second pivot joints 356, 358, about which the control surface 270 rotates, and coupling 606 the pivot joints 356, 358 to the one or more holes in the first and second pivot mountings 280, 290.

Figure 7:
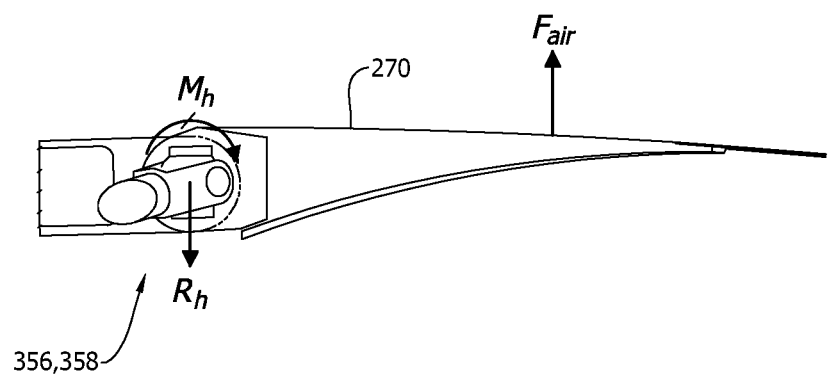
FIG. 7 is a free body diagram showing a side view of the forces acting on the control surface and pivot joints.
Figure 8:
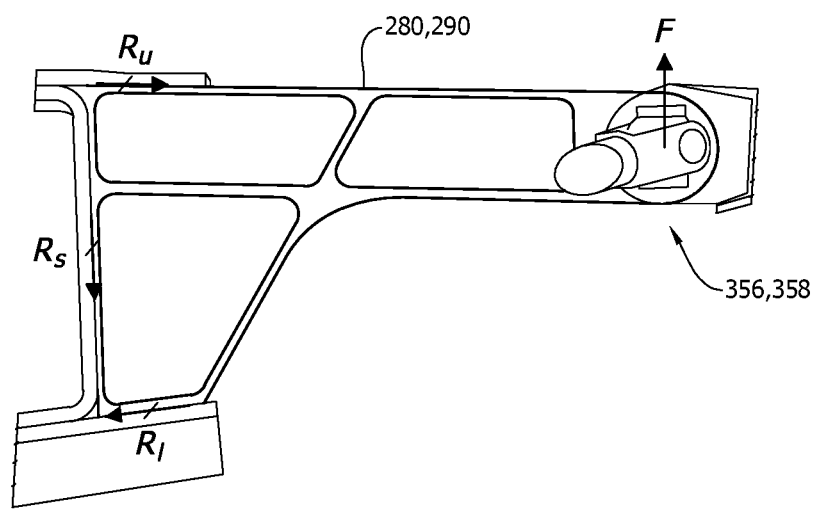
FIG. 8 is a free body diagram showing a side view of the forces acting on one of a first or second pivot mounting of the aerial vehicle control surface actuation system.
Figure 9:
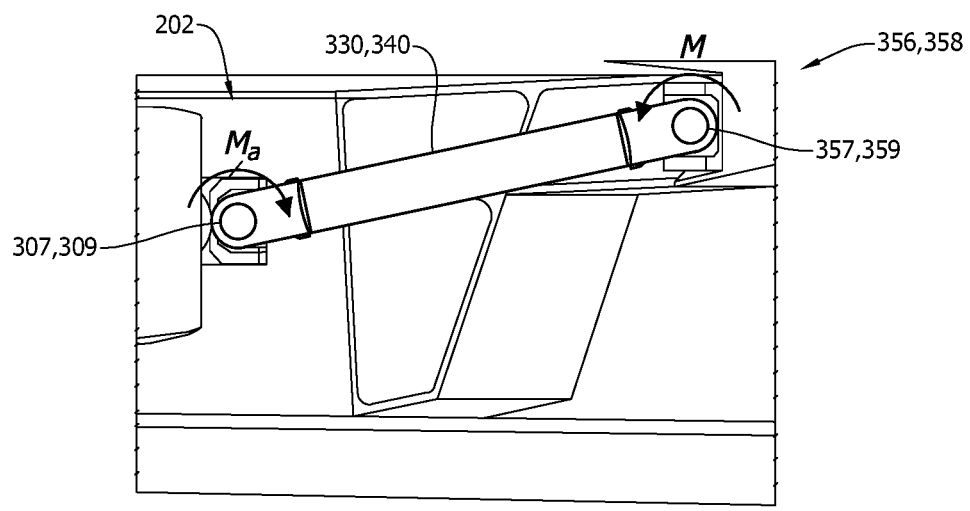
FIG. 9 is a free body diagram showing a perspective view of the forces acting on one of a first or second torque tube of the aerial vehicle control surface actuation system.

FIGS. 7-9 are free body diagrams showing how the air loads on the control surface 270 are reacted through the system 200. With reference to FIG. 7, the control surface 270 is subject to an air pressure force $F_{air}$ that creates a resulting moment $M_h$ and shear force $R_h$ at each of the first and second pivot joints 356, 358. With reference to FIG. 8, the shear loads generated by the shear force $R_h$ at the first and second pivot joints 356, 358 are reacted through the pivot mountings 280, 290 and into the wing box (not shown) as shear forces $R_u$, $R_s$, and $R_l$. With reference to FIG. 9, the torsional loads created by the moment $M_h$ about the first and second pivot joints 356, 358 are reacted through the first and second torque tubes 330, 340 as M via first and second control surface universal joints 357, 359, then transferred to the rotary actuator 202 as $M_a$ via first and second actuator universal joints 307, 309. Separating the load paths for shear loads and torsional loads allows each one to be reacted by components that are structurally suited to handle them. This results in better actuator reliability and more structurally efficient control surface support fittings.

The disclosed control surface actuation system 200 provides several benefits. First, separating the actuator axis 220 and the hinge axis 222 optimizes the usage of wing space and improves aerodynamic performance. The rotary actuator 202 must be seated sufficiently low in the wing 104 that it does not protrude from the top of the wing 104 and disrupt its aerodynamic design. Conversely, the hinge axis 222 of the control surface 270 should be placed as close as possible to the upper skin of the wing 104 to maximize the control surface's 270 effective area and thus its aerodynamic performance. Placing the hinge axis 222 any lower would require portions of the upper skin to be cut out to provide clearance for portions of the pivot joints 356, 358. Such cutouts create flow disturbances over the upper skin of the wing 104 that degrade the wing's 104 overall performance. The control surface 270 and the one or more lugs 375 or clevis bracket of the system 200 disclosed herein may be configured such that the upper skin of the wing 104 is free of cutouts for the control surface actuation system 200. Separating the actuator axis 220 and the hinge axis 222 also allows for the pivot joints 356, 358 to be designed and installed independently of the rotary actuator 202.

Additionally, the wing 104 and control surface 270 are subject to considerable aerodynamic forces during flight that may cause them to deflect. The degrees of freedom of the disclosed configuration allow the rotary actuator 202 to remain unaffected by the bending of the wing 104 and control surface 270, improving the performance of the rotary actuator 202. Bending of the wing 104 and control surface 270 results in minor rotation of the actuator universal joints 307, 309, 357, 359 and does not drive bending loads into the rotary actuator 202. Without these degrees of freedom, the rotary actuator 202 may experience undesirable seal wear or metal fatigue, potentially leading to actuator leakage or housing crack formation.

Furthermore, the design disclosed herein allows for safe and efficient management of the loads generated by the control surface 270. The curvature of the wing 104 creates negative pressure on the control surface 270 in its stowed configuration, generating a suction force that creates an overturning moment about the hinge axis 222. Conversely, when fully deployed, the control surface 270 will be under positive pressure, generating a bursting force that creates an overturning moment about the hinge axis 222 in the opposite direction. If the hinge axis 222 were concentric with the actuator axis 220, the loads generated by the overturning moment would be reacted primarily through the rotary actuator 202. While the rotary actuator 202 can safely handle pure torsional loads, shear loads can damage the rotary actuator 202, causing operational issues such as actuator distortion, leaks, and jams.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An aerial vehicle control surface actuation system, comprising:
   a rotary actuator having opposing output shaft ends coupled via actuator universal joints to first and second torque tubes extending angularly from substantially obliquely relative to the rotary actuator;
   a control surface; and
   first and second pivot joints coupled to a hinged end of the control surface, each of the first and second pivot joints being respectively coupled to the first and second torque tubes via control surface universal joints such that rotation of the first and second torque tubes causes rotation of the control surface relative to a hinge axis.

2. The system of claim 1, further comprising first and second pivot mountings disposed on an aft portion of a wing structure, each of the first and second pivot mountings having one or more holes that define the hinge axis and support the first and second pivot joints about which the control surface rotates.

3. The system of claim 1, wherein the rotary actuator defines an actuator axis that is offset from the hinge axis.

4. The system of claim 1, wherein the control surface is a spoiler mounted on first and second spoiler support fittings.

5. The system of claim 1, wherein the rotary actuator is disposed on an aft portion of a wing structure.

6. The system of claim 1, wherein the hinged end of the control surface includes one or more lugs connected thereto, each lug having at least one hole aligned with the hinge axis about which the control surface rotates when the rotary actuator rotates the first and second torque tubes.

7. The system of claim 6, wherein each of the first and second pivot joints comprises a yoke coupled to a shaft that extends through and rotates the one or more lugs connected to the hinged end of the control surface.

8. The system of claim 6, wherein each of the first and second pivot joints comprises a yoke coupled to a shaft that extends through the at least one hole in the one or more lugs connected to the hinged end of the control surface, and wherein a bracket on an end of the shaft is coupled to one of the one or more lugs such that rotation of the shaft causes rotation of the one or more lugs and the control surface.

9. The system of claim 6, wherein the control surface and one or more lugs are configured such that an upper surface of a wing structure is free of cutouts for the control surface actuation system.

10. The system of claim 6, wherein each of the first and second pivot joints comprises a yoke disposed on a splined drive shaft that extends through and rotates the one or more lugs connected to the hinged end of the control surface.

11. An aerial vehicle comprising:
   a fuselage;
   a wing including a rear spar;
   a control surface actuation system mounted on the wing comprising:
      an actuator support fitting mounted on the rear spar;
      a rotary actuator mounted on the actuator support fitting and having opposing output shaft ends, the rotary actuator defining an actuator axis;
      first and second torque tubes coupled via actuator universal joints to the opposing output shaft ends and extending substantially obliquely relative to the opposing output shaft ends;
      first and second pivot mountings mounted on the rear spar on opposing sides of the rotary actuator;
      a control surface; and
      first and second pivot joints coupled to a hinged end of the control surface and respectively connected to the first and second pivot mountings, each joint being coupled to one of the first and second torque tubes via control surface universal joints, such that rotation of the first and second torque tubes causes rotation of the control surface relative to a hinge axis.

12. The aerial vehicle of claim 11, wherein the control surface is subject to an air pressure force that creates a resulting shear force and a resulting moment at each of the first and second pivot joints, wherein the resulting shear force is reacted through the pivot mountings and into the wing and the resulting moment is reacted through the first and second torque tubes such that load paths for the shear force and the moment are separated and respectively handled by the pivot mountings and the torque tubes.

13. The aerial vehicle of claim 11, wherein the actuator axis is offset from the hinge axis.

14. The aerial vehicle of claim 11, wherein each of the first and second pivot joints comprises a yoke disposed on a splined drive shaft that extends through and rotates a clevis bracket coupled to the hinged end of the control surface.

15. The aerial vehicle of claim 11, wherein the control surface and one or more lugs are configured such that an upper surface of the wing is free of cutouts for the control surface actuation system.

16. The aerial vehicle of claim 11, wherein the hinged end of the control surface includes one or more lugs connected thereto, each having at least one hole aligned with the hinge axis about which the control surface rotates when the rotary actuator rotates the first and second torque tubes.

17. The aerial vehicle of claim 16, wherein each of the first and second pivot joints comprises a yoke disposed on a splined drive shaft that extends through and rotates the one or more lugs connected to the hinged end of the control surface.

18. The aerial vehicle of claim 16, wherein each of the first and second pivot joints comprises a yoke coupled to a shaft that extends through the at least one hole in the one or more lugs connected to the hinged end of the control surface, and wherein a bracket on an end of the shaft is coupled to one of the one or more lugs such that rotation of the shaft causes rotation of the one or more lugs and the control surface.

19. The aerial vehicle of claim 16, wherein each of the first and second pivot joints comprises a yoke coupled to a shaft that extends through and rotates the one or more lugs connected to the hinged end of the control surface.

20. A method of providing a rotary-actuated control surface comprising:
- securing a rotary actuator having opposing output shaft ends to an aft portion of a wing structure;
- coupling, via actuator universal joints, the opposing output shaft ends to first and second torque tubes extending angularly from substantially obliquely relative to the rotary actuator;
- coupling first and second pivot joints respectively to the first and second torque tubes via control surface universal joints;
- coupling the first and second pivot joints to a hinged end of the control surface;
- securing first and second pivot mountings on the aft portion of the wing structure, each having one or more holes that define a hinge axis and are configured to support the first and second pivot joints about which the control surface rotates; and
- coupling the first and second pivot joints to the one or more holes in the first and second pivot mountings.

21. The method of claim 20, wherein the rotary actuator defines an actuator axis that is offset from the hinge axis.

* * * * *